(12) United States Patent
Gupta et al.

(10) Patent No.: US 11,099,918 B2
(45) Date of Patent: Aug. 24, 2021

(54) ACCELERATING ALGORITHMS AND APPLICATIONS ON FPGAS

(71) Applicant: Xilinx, Inc., San Jose, CA (US)

(72) Inventors: Nagesh Chandrasekaran Gupta, Saratoga, CA (US); Varun Santhaseelan, Santa Clara, CA (US)

(73) Assignee: XILINX, INC., San Jose, CA (US)

( * ) Notice: Subject to any disclaimer, the term of this patent is extended or adjusted under 35 U.S.C. 154(b) by 325 days.

(21) Appl. No.: 15/151,357

(22) Filed: May 10, 2016

(65) Prior Publication Data

US 2016/0335120 A1 Nov. 17, 2016

Related U.S. Application Data

(60) Provisional application No. 62/159,783, filed on May 11, 2015.

(51) Int. Cl.
*G06F 9/54* (2006.01)
*G06F 9/50* (2006.01)

(52) U.S. Cl.
CPC ............ *G06F 9/547* (2013.01); *G06F 9/5044* (2013.01); *G06F 2209/509* (2013.01)

(58) Field of Classification Search
None
See application file for complete search history.

(56) References Cited

U.S. PATENT DOCUMENTS

| 9,846,660 | B2 * | 12/2017 | Styles | G06F 13/28 |
| 2003/0050055 | A1 * | 3/2003 | Ting | H04M 3/42178 455/419 |
| 2013/0212365 | A1 * | 8/2013 | Chen | G06F 17/5054 713/1 |

* cited by examiner

*Primary Examiner* — Lewis A Bullock, Jr.
*Assistant Examiner* — Melissa A Headly
(74) *Attorney, Agent, or Firm* — Patterson + Sheridan, LLP

(57) ABSTRACT

A method for accelerating algorithms and applications on field-programmable gate arrays (FPGAs). The method includes: obtaining, from a host application, by a run-time configurable kernel, implemented on an FPGA, a first set of kernel input data; obtaining, from the host application, by the run-time configurable kernel, a first set of kernel operation parameters; parameterizing the run-time configurable kernel at run-time, using the first set of kernel operation parameters; and performing, by the parameterized run-time configurable kernel, a first kernel operation on the first set of kernel input data to obtain a first set of kernel output data.

17 Claims, 9 Drawing Sheets

ACCELERATING ALGORITHMS AND APPLICATIONS ON FPGAS

CROSS-REFERENCE TO RELATED APPLICATIONS

This application claims priority to U.S. Provisional Patent Application No. 62/159,783 filed May 11, 2015, the entire disclosure of which is hereby expressly incorporated by reference herein.

BACKGROUND

Accelerator devices such as field programmable gate arrays (FPGAs) may be used to outsource computations from a host computing device. A kernel, executing on the accelerator device may perform the outsourced computations and may return a result to the host computing device. Prior to performing the outsourced computations, the kernel needs to be programmed into the accelerator device.

SUMMARY

In general, in one aspect, the invention relates to a method for accelerating algorithms and applications on field-programmable gate arrays (FPGAs). The method comprises: obtaining, from a host application, by a run-time configurable kernel, implemented on an FPGA, a first set of kernel input data; obtaining, from the host application, by the run-time configurable kernel, a first set of kernel operation parameters; parameterizing the run-time configurable kernel at run-time, using the first set of kernel operation parameters; and performing, by the parameterized run-time configurable kernel, a first kernel operation on the first set of kernel input data to obtain a first set of kernel output data.

In general, in one aspect, the invention relates to a system for accelerating algorithms and applications on field-programmable gate arrays (FPGAs). The system comprises: a host computing device; an FPGA device; and a run-time configurable kernel executing on an FPGA of the FPGA device, and configured to: obtain, from a host application executing on the host computing device, a first set of kernel input data; obtain, from the host application, a first set of kernel operation parameters; parameterize the run-time configurable kernel at run-time, using the first set of kernel operation parameters; and perform a first kernel operation on the first set of kernel input data to obtain a first set of kernel output data.

In general, in one aspect, the invention relates to a non-transitory computer readable medium (CRM) storing instructions for accelerating algorithms and applications on field-programmable gate arrays (FPGAs). The instructions comprise functionality for: obtaining, from a host application, by a run-time configurable kernel, implemented on an FPGA, a first set of kernel input data; obtaining, from the host application, by the run-time configurable kernel, a first set of kernel operation parameters; parameterizing the run-time configurable kernel at run-time, using the first set of kernel operation parameters; and performing, by the parameterized run-time configurable kernel, a first kernel operation on the first set of kernel input data to obtain a first set of kernel output data.

DETAILED DESCRIPTION

Figure 1A:
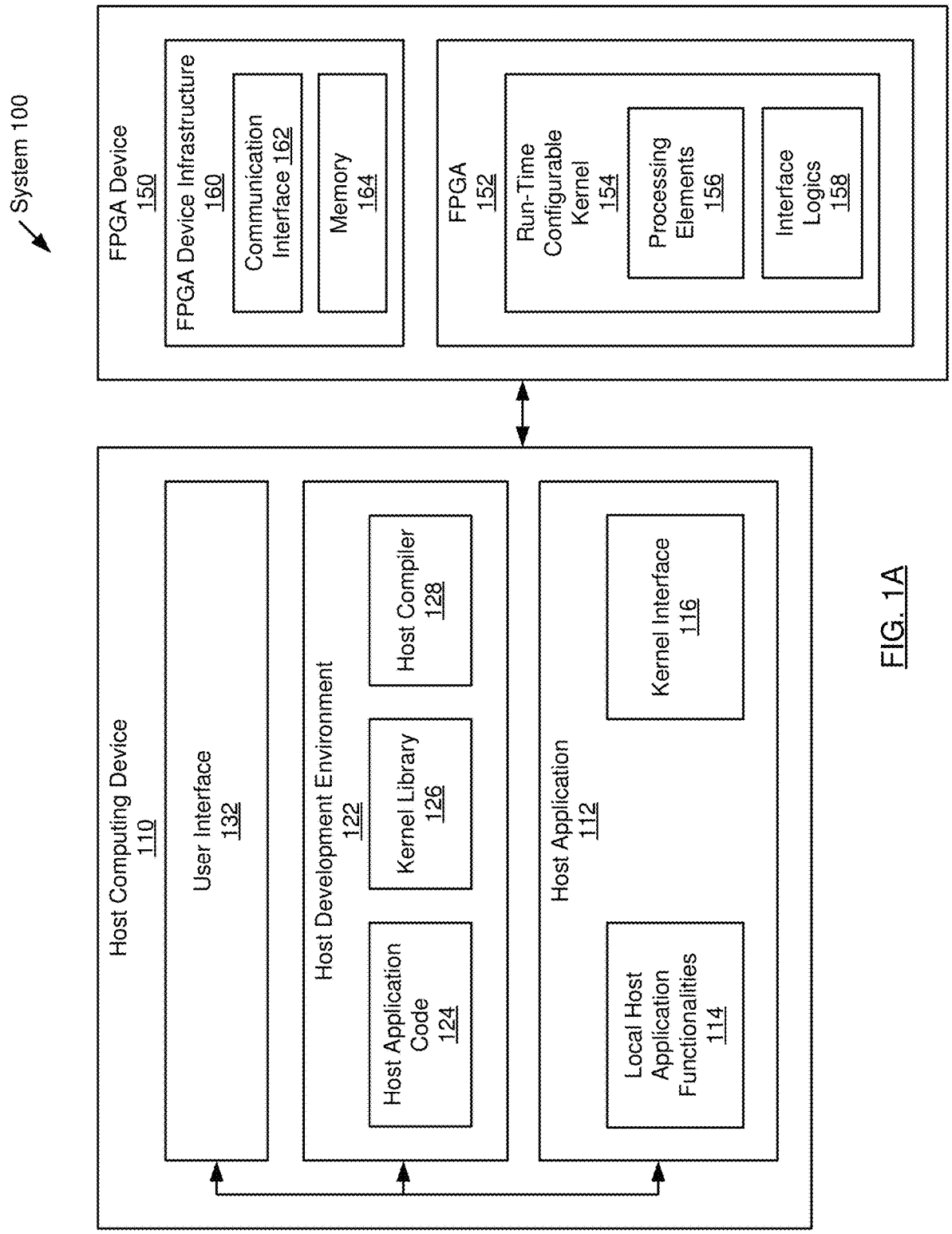
FIGS. 1A-1D show systems, in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for performing computations on an accelerator device. The system may execute a software application, for example, a scientific, technical or financial application that processes data. The processing of data may be divided between a host application that executes on the host computing device and a kernel that executes on the accelerator device. While the host application may provide a variety of functionalities including, e.g., providing a user interface, performing interactions with other interfacing devices, preprocessing of data, etc., certain operations may be outsourced, by the host computing device, to the accelerator device. Operations outsourced to the accelerator device may include, for example, math-intensive operations, including operations whose execution may be parallelized, such as matrix operations. The outsourcing may accelerate the execution of these operations and/or may reduce the computational load on the host computing device.

The accelerator device may include one or more integrated circuits, configured to accept, from the host computing device, input data and instructions for performing the outsourced operation(s) on the input data, and for returning a result of the completed outsourced operation(s) to the host computing device.

In one or more embodiments of the invention, the accelerator device includes a field programmable gate array (FPGA). The kernel, programmed into the FPGA, may perform the outsourced operations, as subsequently described.

In one embodiment of the invention, the FPGA, after the kernel has been programmed into the FPGA, may perform a variety of outsourced operations without requiring reprogramming. The FPGA may, for example, perform operations on input data of different dimensionality, and/or the FPGA may process different types of input data. Consider, for example, a scenario in which the kernel is used for processing image data and for speech data. The same kernel, programmed into the same FPGA, may be used to perform image processing operations and speech processing operations, even though the nature of the data may be very different. The behavior of the kernel, in accordance with one or more embodiments of the invention, may be governed by a kernel parameterization. In the speech processing and the image processing applications, for example, different kernel parameterizations may be used. No reprogramming of the FPGA with a different kernel is thus necessary, when switching between image processing operations and speech processing operations. The parameterization of kernels is further discussed below.

FIG. 1A shows a system, in accordance with one or more embodiments of the invention. The system may execute a distributed software application. As shown in FIG. 1A, the system (100) includes a host computing device (110) and a field-programmable gate array (FPGA) device (150). Certain functionalities of the distributed software application may be provided by a host application (112), executed by the host computing device (110), whereas other functionalities of the distributed software application may be provided by a run-time configurable kernel (154), executed by the FPGA device (150). Each of the components of the host computing device and of the FPGA device is subsequently described.

The host computing device (110), in accordance with one or more embodiments of the invention, is a computing device that an application developer may rely on, in order to develop the distributed software application, and/or that a user may rely on in order to access and execute the distributed software application. The host computing device (110) may be, for example, a computing device similar to the computing device described with reference to FIG. 6.

The host computing device (110), in accordance with an embodiment of the invention, includes a host application (112), a host development environment (122) and a user interface (132).

The host application (112), in accordance with an embodiment of the invention, includes computer-executable instructions that enable the host computing device (110) to provide certain functionalities, including, for example, local processing of data and outsourcing of data processing operations to the run-time configurable kernel on the FPGA device (150). These functionalities are described in detail below. The host application (112) may be stored on a non-transitory computer readable medium, e.g., on a hard disk drive, flash memory, etc., of the host computing device. Execution of the host application may be initiated by a user requesting the host application, and/or by a trigger event, e.g. the availability of data to be processed. The host application may be executable directly on the host computing device (110), or it may require a virtual machine or a runtime environment.

In one or more embodiments of the invention, the host application (112) includes local host application functionalities (114) and a kernel interface (116). The local host application functionalities (114) may include software instructions that may be executed locally, on the host computing device (110). These instructions may provide, for example, functionalities for obtaining data, e.g., from a user or from another data source such as a data acquisition system or a storage medium, and for preprocessing the obtained data in preparation of an outsourced operation to be performed elsewhere by a run-time configurable kernel. The instructions may further include functionalities for post-processing of kernel operation output data obtained from the run-time configurable kernel. The kernel interface (116) may include software instructions that, when executed by the host computing device (110), establish an interface to the run-time configurable kernel (154) executing on the FPGA device (150). The kernel interface (116) may be used in order to provide kernel operation input data to the run-time configurable kernel (154), along with kernel operation parameters that specify the operation to be performed on the kernel operation input data by the run-time configurable kernel. The kernel interface (116) may further obtain, from the run-time configurable kernel (154), kernel operation output data, produced by the run-time configurable kernel (154). In one embodiment of the invention, the kernel interface (116) implements one or more function calls. A function call may call the run-time configurable kernel (154) executed by the FPGA device (150). The function call may include input arguments such as the kernel operation input data and kernel operation parameters. The function call may further include return arguments to receive the kernel operation output data from the run-time configurable kernel (154).

In one embodiment of the invention, the local host application functionalities (114) in concert with the kernel interface (116) perform functions that involve the outsourcing of computations to the run-time configurable kernel. While the local host application functionalities (114) may implement local data processing, the outsourced data processing, to be performed by one or more run-time configurable kernels, may be controlled by the kernel interface (116).

In one embodiment of the invention, the host computing device (110) further includes a host development environment (122). The host development environment may be used by an application developer to generate the host application (112). The host development environment (122), in accordance with an embodiment of the invention, includes host application code (124), a kernel library (126) and a host compiler (128).

The host application code (124), in accordance with an embodiment of the invention, is the code, which when compiled by the host compiler (128) forms the host application (112). The host application code may be written in a programming language such as C, Java, or any other programming language suitable for implementing the host application (122). The host application code (124) may include code fragments that implement the local host application functionalities (114). The host application code (124) may further include code fragments that implement the kernel interface (116), enabling the host application (112) to interact with the run-time configurable kernel (154) that executes on the FPGA device (150). The code fragments for the kernel interface (116) may be obtained from a kernel library (126).

Continuing with the discussion of the host development environment (122), the kernel library (126), in accordance with an embodiment of the invention, is a library of kernels. A kernel, selected from the kernel library (126), may be deployed on an FPGA (152) of the FPGA device (150) by programming the FPGA with the kernel. Once programmed into the FPGA (152) the kernel may be run-time configurable, thus allowing the parameterization of kernel behavior at run-time, without requiring reprogramming of the kernel into the FPGA. The library of kernels may include various kernels configured to perform different operations. One kernel may, for example, be configured to implement one or more operations of a convolutional neural network, whereas another kernel may be configured to perform matrix multiplications, recurrent neural networks, convolutions or deconvolutions, etc. Those skilled in the art will recognize that the kernel library is not limited to the above operations. Any type of mathematical and or logical data manipulation may be performed by a kernel, without departing from the invention.

A kernel in the kernel library may be specific to a particular FPGA. For example, FPGAs manufactured by different manufacturers may use different kernel programming protocols, while FPGAs of different size may require different-size kernels. A user in possession of a kernel library may generate FPGA-specific run-time configurable kernels prior to compiling a kernel to be deployed on an FPGA as a run-time configurable kernel. Compile-time customization of the kernel may include customization of the design of the kernel in the kernel library to match the specifications of the targeted FPGA and subsequent compilation of the customized kernel. For example, the user may scale an existing kernel in the kernel library to include a sufficient number of processing elements necessary for performing a desired kernel operation. Compile-time customization of a kernel may also include scaling of a kernel to span two or more FPGAs, for example, if the desired kernel is too large for a single FPGA. In this case, the compiling may result in multiple kernels to be programmed into different FPGAs. Each of the multiple kernels may perform processing of tiles of a large input data set. For example, if a large data set is processed, certain rows, columns, or any other subsets (tiles) of the data set, respectively, may be processed by one kernel, and other rows, columns, or other types of subsets of the data set, respectively, may be processed by another kernel. The kernels may be customized to include communication capabilities to communicate either directly from kernel to kernel, or indirectly, e.g., via memory on the FPGA device, e.g., to synchronize and/or transfer data, if needed. Further, compile-time customizations may also include various optimizations such as the unrolling or combination of one or more loops to reduce the likelihood of idle processing elements during the execution of a kernel operation and the definition of memory regions to be used for storing kernel operation input and/or output data.

In one embodiment of the invention, the kernel library further includes code fragments that enable the calling of the run-time configurable kernel (154) being executed by the FPGA device (150) from the host application. The developer of the host application may rely on these code fragments for implementing the kernel interface (116) of the host application (112). These code fragments may be provided for various programming languages and may include additional libraries necessary for the communication with the run-time configurable kernel (154) on the FPGA device (150).

Continuing with the discussion of the host development environment (122), the host compiler (128), in accordance with an embodiment of the invention, is a compiler that generates the executable host application (112) from the host application code (124). The compiler may further link additional required libraries, e.g., libraries necessary for the communication with the run-time configurable kernel. The compiler may be, for example, a compiler for C, Java, C++, OpenCL, or Python or for any other language.

In one or more embodiments of the invention, the host computing device (110) further includes a user interface (132). The user interface may include separate or combined user interfaces for the host application (112) and for the host development environment (122). The user interface (132) may be a graphical user interface (GUI) configured to accept user input and to display output to the user. Input may be provided using GUI widgets (e.g., radio buttons, drop-down lists, textboxes, etc.). Output to the user may be visualized in textboxes, graphs, pictures gauges, etc. The user interface (132) may further support audio input and/or output, for example, in speech processing applications, and/or other data input/output interfaces.

Continuing with the discussion of FIG. 1A, the system (100), in accordance with an embodiment of the invention, further includes an FPGA device (150). The FPGA device (150) may be a standalone computing device, or it may be an adapter card to be installed in the host computing device (110). Alternatively, the an FPGA may be directly included in the host computing device, for example, if the processor of the host computing device is a hybrid processor that includes, e.g., a central processing unit (CPU) and an FPGA. The FPGA device (150) may be operationally connected to the host computing device (110). Although FIG. 1A shows the FPGA device (150) and the host computing device (110) as separate devices, in one or more embodiments, the FPGA device (150) and the host computing device (110) are part of the same device and/or made from the same silicon.

In one or more embodiments of the invention, the FPGA device (150) includes one or more FPGAs (152). FPGAs in accordance with one or more embodiments of the invention may include any number of logic gates and may include additional components such as, for example, random access memory (RAM). An FPGA (152), in accordance with one or more embodiments of the invention, may be programmed and re-programmed with a run-time configurable kernel (154). The run-time configurable kernel may include a number of processing element (156). A processing element, in accordance with an embodiment of the invention, is a basic mathematical or logical operation. A processing element may be, for example, a multiplication, an addition, or other mathematical or logical operations. A processing element may be implemented by a set of logic gates of the FPGA, interconnected in a manner to perform the mathematical or logical operation of the processing element. The set of processing elements (156) are thus formed from interconnected networks of logic gates that are combined as specified by the run-time configurable kernel, in accordance with an embodiment of the invention, thereby establishing the computational substrate that may perform a single kernel operation. A single kernel operation may include many basic operations being performed in parallel. For example, a single kernel operation may simultaneously perform a multiplication on each of many values received with a set of kernel operation input data.

In one or more embodiments, neither the logic gates being used nor the interconnections between these logic gates may be altered once the run-time configurable kernel has been programmed into the FPGA, unless a different run-time configurable kernel is programmed into the FPGA. However, because the design of the run-time configurable kernel is chosen to allow re-parameterization, the run-time configurable kernel may nevertheless perform different operations, in accordance with one or more embodiments of the invention. Consider, for example, a scenario in which the kernel operation (i.e., the operation to be performed by the run-time configurable kernel) is a matrix multiplication, to be performed on kernel operation input data. In this scenario, the kernel operation input data may include matrices of various dimensions. Accordingly, each time a matrix is received, the run-time configurable kernel may be parameterized based on the size of the received matrix to allow proper performance of the matrix multiplication. Further, consider another scenario in which the kernel operation is a convolution operation. In this scenario, the kernel operation parameters may allow the specification of an input feature map size (specifying the number of rows and columns of entries in each of the input feature maps); the number of input feature maps to be processed in a kernel operation; the number of output feature maps to be generated by the kernel operation; the size of the convolution filter kernel; the stride to be used when applying the convolution filter kernel to an input feature map; the neighborhood size for pooling, if pooling is performed after the convolution operation; the type of pooling to be performed; and the stride to be used when pooling, etc.

In the embodiment shown in FIG. 1A, the run-time configurable kernel is sized to occupy the majority of the FPGA (e.g. by using the majority of the available logic gates of the FPGA). The remaining available logic gates may be used by interface logics (158). The interface logics (158) may implement functionalities that enable the FPGA to interface with other components of the FPGA device. The interface logics may, for example, implement a memory interface to the FPGA device memory (164). Alternatively, the run-time configurable kernel may be configured to occupy a smaller fraction of the FPGA, thus allowing a second run-time configurable kernel to be accommodated on the FPGA. Further, in an alternative embodiment of the invention, the run-time configurable kernel is split into multiple smaller kernels to span multiple FPGAs, e.g., in cases where the run-time configurable kernel is too large to be accommodated on a single FPGA.

Continuing with the discussion of the FPGA device, the FPGA device (150) may further include FPGA device infrastructure (160) that may include additional components such as volatile and/or non-volatile memory (164), e.g. random access memory (RAM), flash memory, a video input/output interface such as HDMI or mini DVI, display port, etc., and peripheral circuits such as a communication interface (162) to enable communication between the FPGA device (150) and the host computing device (110). The communication interface (162) may be, for example, a bus interface such as the Peripheral Component Interconnect Express (PCIe) bus, a network interface, such as an Ethernet local area network, or any other type of data communication interface. The memory (164) may be used as a buffer for input and output data to and from the run-time configurable kernel (154). For example, the memory (164) may be used to receive kernel operation input data and/or kernel operation parameters from the host computing device via the communication interface (162). Prior to the execution of a kernel operation, the kernel operation input data and/or kernel operation parameters may be transferred from the FPGA device memory (164) to FPGA-internal RAM. Further, after the completion of the kernel operation, kernel operation output data that is initially stored in FPGA-internal RAM, may be transferred to the FPGA device memory (164), for example, to allow the kernel operation output data to be returned to the host computing device (110) via the communication interface (162).

Figure 1B:
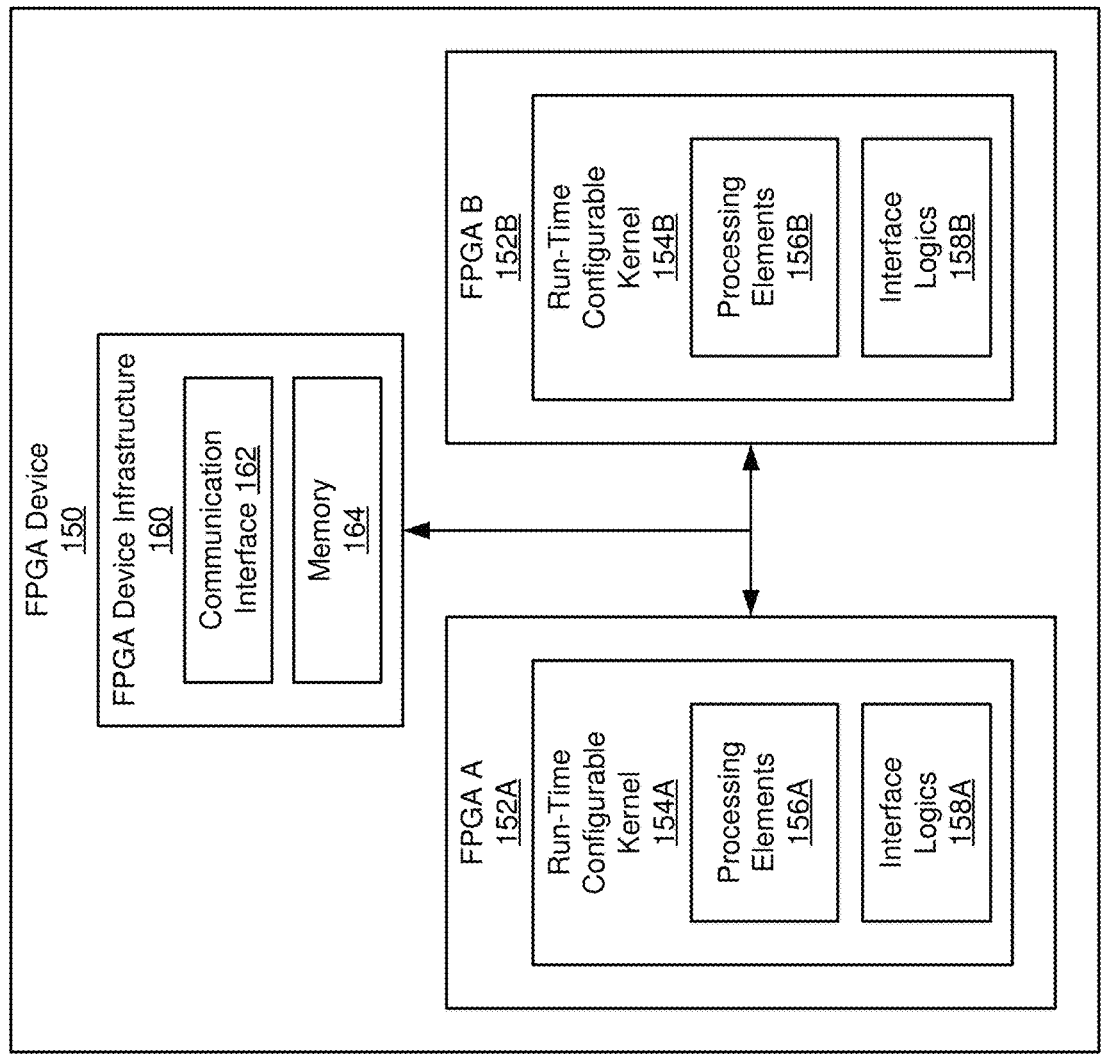
Figure 1C:
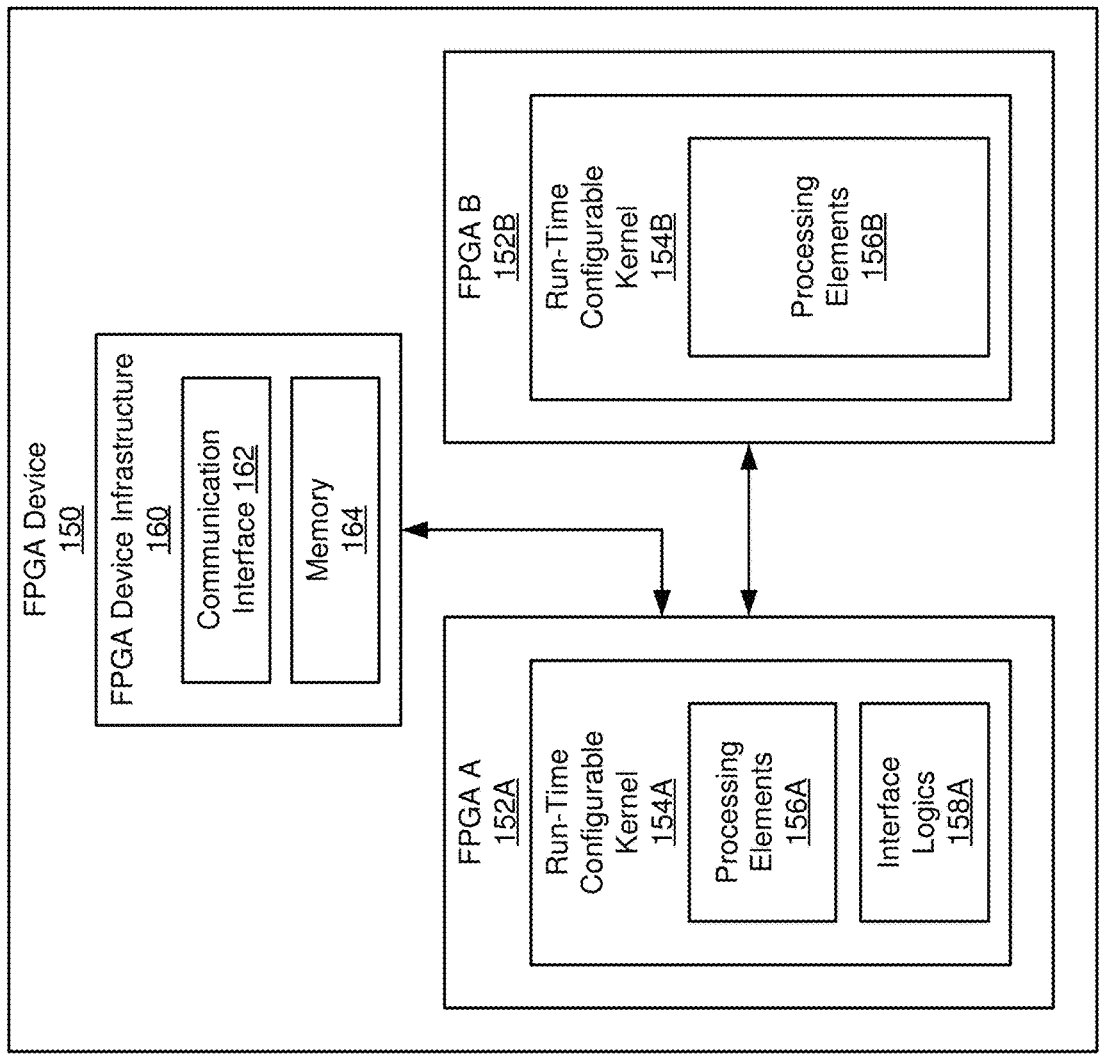
Figure 1D:
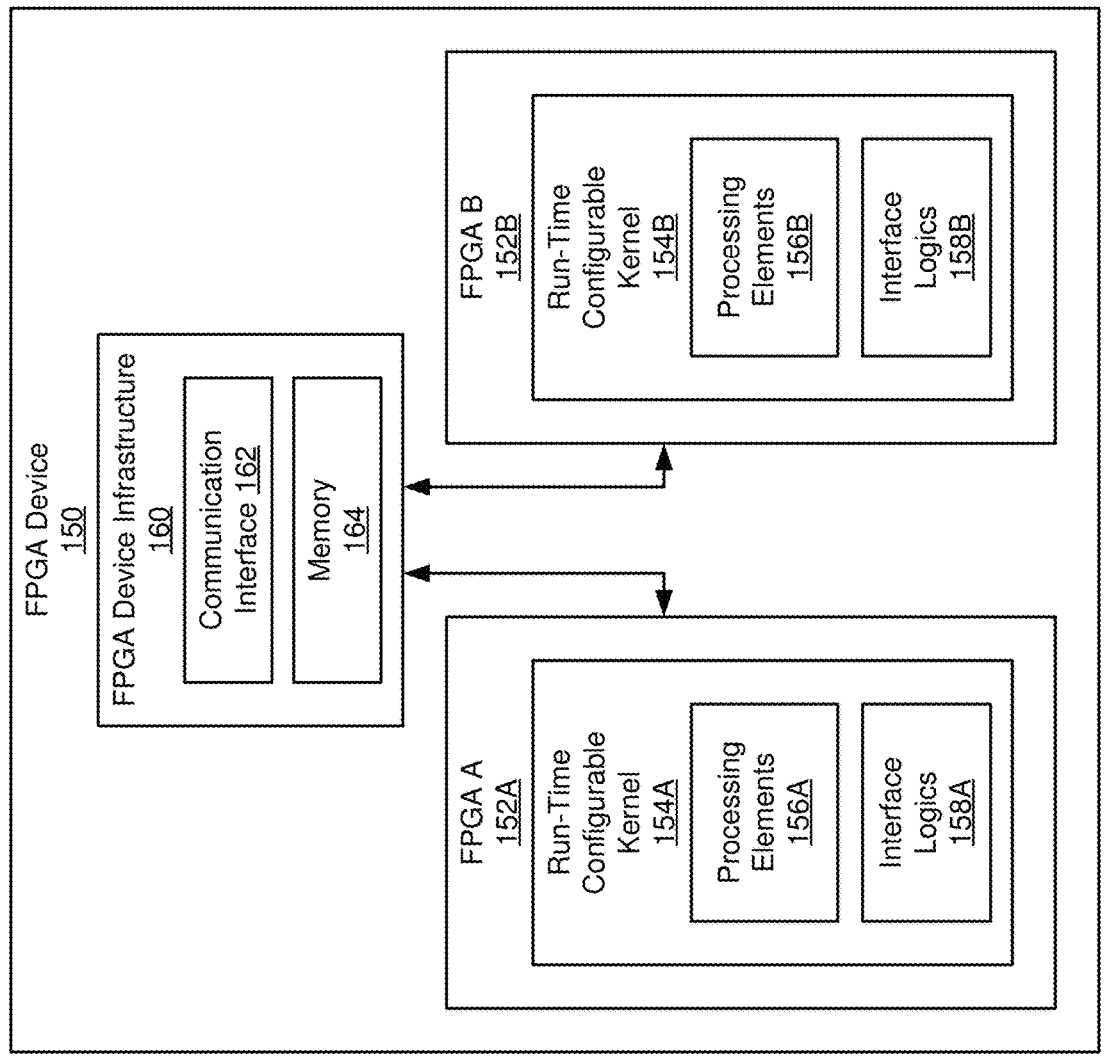

FIGS. 1B-1D show alternative FPGA devices (150) that include multiple FPGAs (152A, 152B) in accordance with one or more embodiments of the invention. While FIGS. 1B-1D show FPGA devices with two FPGAs, those skilled in the art will recognize that multi-FPGA configurations may include any number of FPGAs, without departing from the invention.

In the multi-FPGA configuration shown in FIG. 1B, both FPGAs (152A, 152B) include interface logics (158A, 158B) with an interface to the FPGA device memory (164). However, in the embodiment shown in FIG. 1B, only the interface logics of FPGA A (152A) include data transfer coordination logic that coordinates data transfers between the FPGA device memory (164) and FPGA A (152A) and between the FPGA device memory (164) and FPGA B (152B), respectively. The data transfer coordination logic may, for example, initially coordinate the data transfer between the FPGA device memory (164) and FPGA A (152A), prior to signaling to FPGA B (152B) that it may begin performing its data transfers with the FPGA device memory (164).

In the multi-FPGA configuration shown in FIG. 1C, only FPGA A (152A) includes interface logics (158A) connecting to the FPGA device memory (164). FPGA B (152B) may not be equipped with the interface logics, and all available logic gates may thus be used for the processing elements (156B). The interface logics (158A) of FPGA A (152A) may handle data transfers for both FPGA A and FPGA B (152A, 152B). Data transfers to/from FPGA B may therefore be performed indirectly, via FPGA A.

In the multi_FPGA configuration shown in FIG. 1D, both FPGAs operate independently and may have their own interface logics that may independently perform memory transfers from/to the FPGA device memory (164) via independent memory interfaces. No coordination between data transfers to/from FPGAs A and B may be necessary.

One skilled in the art will recognize that the architecture of the system (100) is not limited to the components shown in FIGS. 1A-1D. For example, the system (100) may include multiple host computing devices that outsource operations to a single FPGA device. Further, the system may also include multiple FPGA devices. Also, an FPGA may accommodate multiple run-time configurable kernels, and/or a single run-time configurable kernel may span multiple FPGAs, without departing from the invention. In addition, while the above description covers outsourced operations performed by FPGAs, those skilled in the art will appreciate that alternatively other processors such as graphics processing units (GPUs), signal processors, application-specific integrated circuits (ASICs) may be used in conjunction with or instead of FPGAs.

Figure 2:
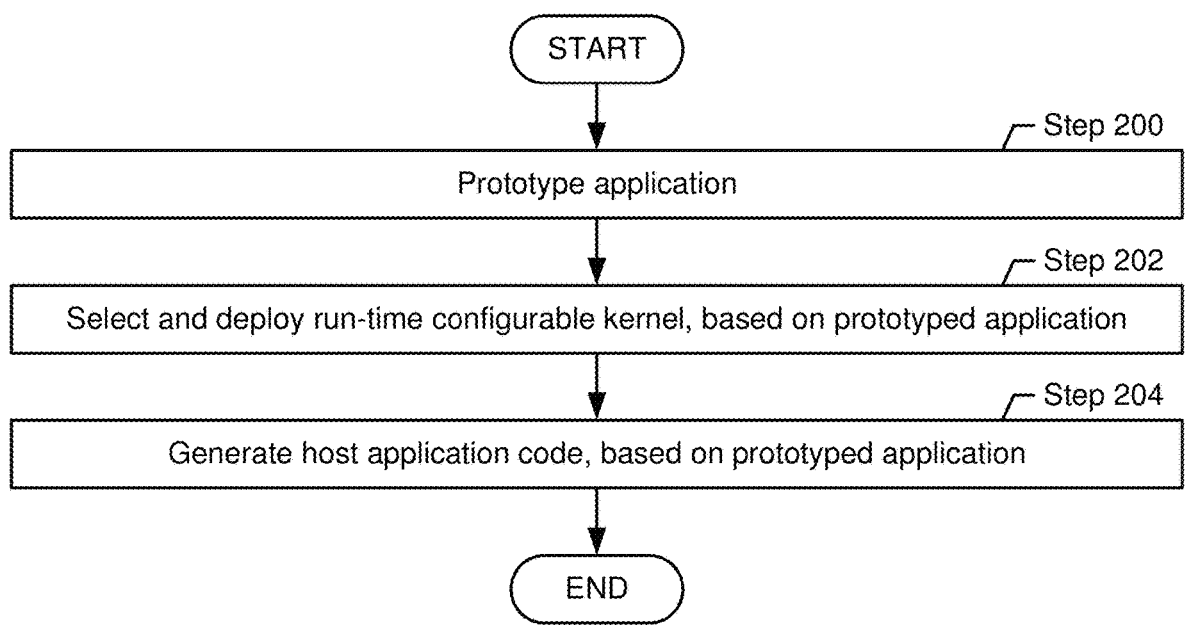
FIGS. 2-4 show flowcharts, in accordance with one or more embodiments of the invention.
Figure 3:
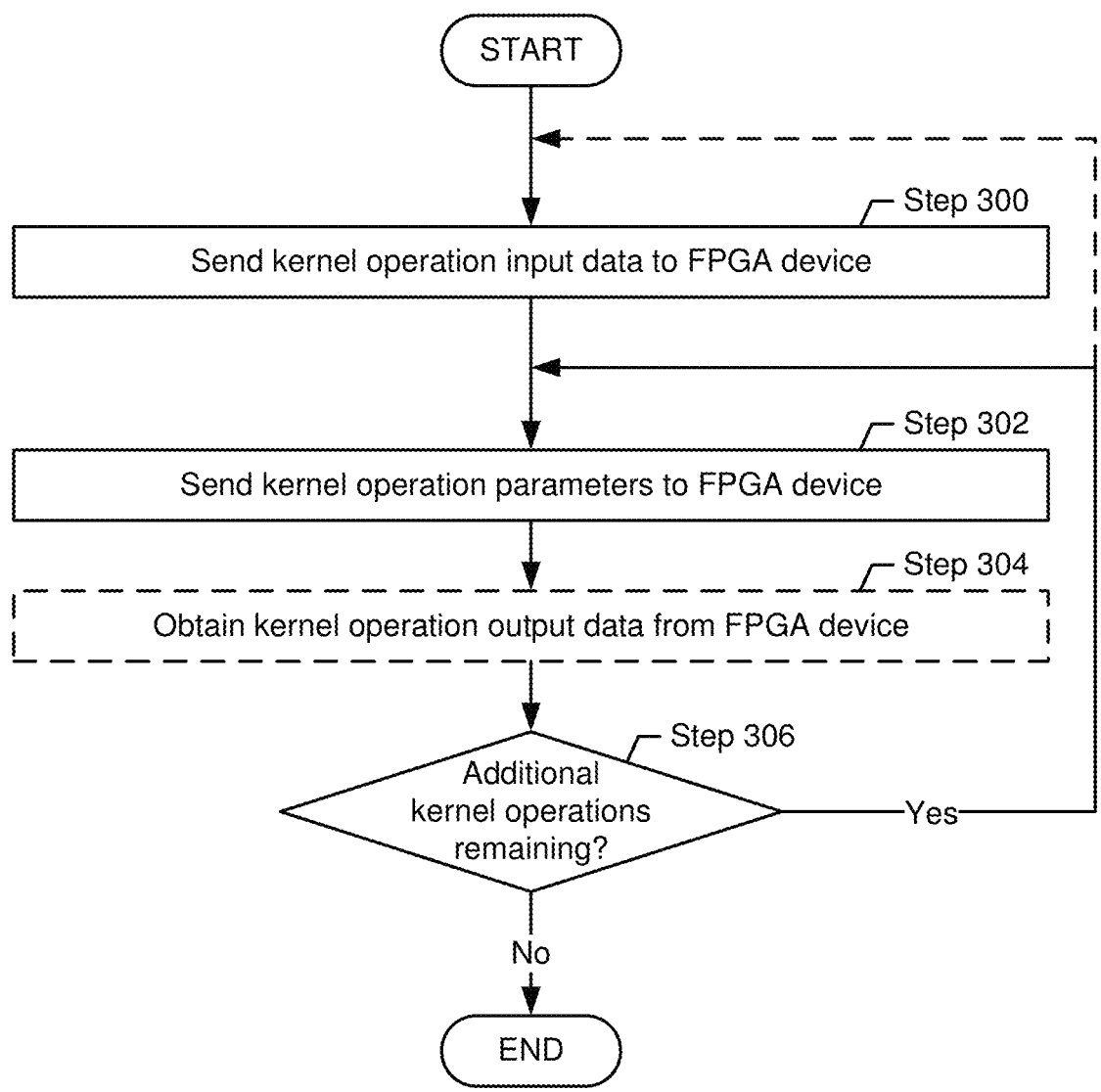
Figure 4:
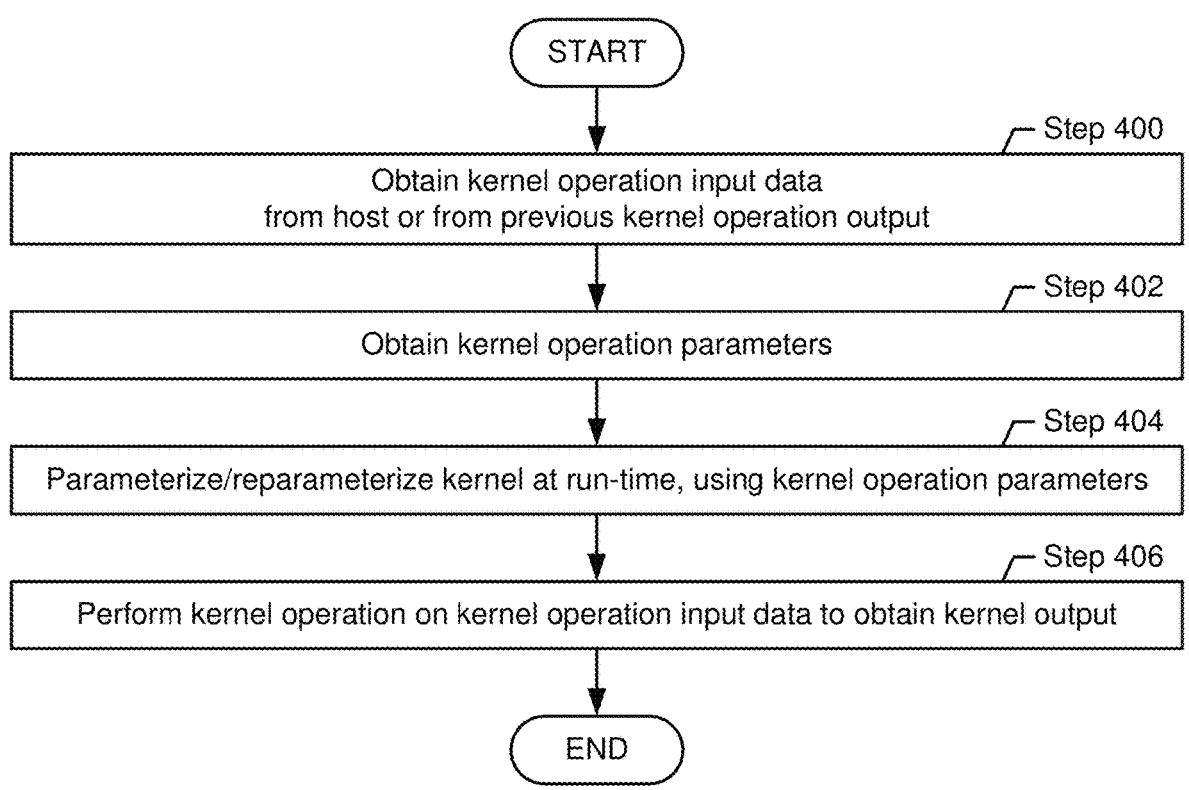

FIGS. 2-4 show flowcharts in accordance with one or more embodiments of the invention. While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 2-4 may be performed in parallel with any other steps shown in FIGS. 2-4 without departing from the invention.

FIG. 2 shows a method for generating a distributed software application that includes a host application and a run-time configurable kernel, in accordance with one or more embodiments of the invention. The distributed software application may perform mathematical and/or logical operations that may be outsourced from the host application to a run-time configurable kernel that is programmed into an FPGA. The method in FIG. 2 may be executed once, prior to the execution of the distributed software application, subsequently described in FIGS. 3 and 4.

Turning to FIG. 2, in Step 200, the distributed software application is prototyped. The prototyping may involve the design and tuning of operations to be performed by the distributed software application. Consider the example of an image classification application that is based on a convolutional neural network (CNN). Prototyping the image classification application may include the determination of the parameters of the CNN, such as the width, depth and height of the convolution layers, the number, type and arrangement of the layers of the CNN, etc. The prototyping of the distributed software application may be performed using development software that is specific to the functionalities included in the distributed software application. The prototyping of the application may be complete, once all design decisions including the choice of algorithms and their parameterization have been made, and once the operations to be outsourced to the run-time configurable kernel have been identified.

In Step 202, the run-time configurable kernel is selected and deployed to the FPGA. In one embodiment of the invention, the run-time configurable kernel is selected based on the results of the prototyping performed in Step 200. More specifically, based on the prototyping performed in Step 200, a particular run-time configurable kernel, capable of performing the operations to be outsourced to the FPGA device, may be selected from the kernel library. The selected kernel may be, for example, a matrix multiplication kernel, if the prototyped application includes matrix multiplications. The matrix multiplication kernel may handle multiple or all matrix multiplications of the prototyped application. Additional run-time configurable kernels may be selected if other operations are required. For example, a second kernel may be selected from the kernel library to perform convolutions. With each call of a selected run-time configurable kernel, the run-time configurable kernel, due to its run-time configurability, may perform different operations (e.g., above described multiplication and convolution kernels may accept kernel operation input data of different dimensionalities). Throughout the execution of the application, a run-time configurable kernel may thus be called repeatedly with different kernel operation parameter sets, as described in detail in FIGS. 3 and 4.

Subsequently, the run-time configurable kernel is programmed into the FPGA of the FPGA device. If multiple kernels are required, e.g., a first kernel configured to perform a convolution, and a second kernel configured to perform a matrix multiplication, the multiple run-time configurable kernels may be programmed into the same or into different FPGAs.

If necessary, the kernel from the kernel library may be customized and recompiled prior to the programming of the kernel into the FPGA, for example in order to be compatible with a particular FPGA being used, and/or in order to implement a specific number of processing elements, required to perform the operations to be outsourced. Aspects of a kernel that may be customized at compile-time include, but are not limited to, the size of the kernel (specified by, e.g., the number of processing elements such as additions and multiplications that the kernel may perform), the numeric format (e.g. the use of fixed point, half, single, and/or double precision floating point representations), the distribution of the kernel (e.g., whether the kernel is to be programmed into a single FPGA, or whether it is to be distributed over multiple FPGAs), the inter-kernel communication (e.g., whether data and synchronization signals are to be exchanged via external memory on the FPGA device, or directly via kernel-to-kernel messaging).

In Step 204 the host application is generated. In one embodiment of the invention, generating the host application includes implementing the functionalities of the prototyped application on the host computing device. However, in contrast to the prototyped application, where all operations may be performed by a single application on the same device, some of the operations, in accordance with an embodiment of the invention, are outsourced to the run-time configurable kernel that is executing on the FPGA device. Accordingly, the host application being generated may not include the outsourced operations but rather includes calls to the run-time configurable kernel that may perform the outsourced operations. Each outsourced operation, as subsequently illustrated in FIGS. 3 and 4, may require the parameterization of the run-time configurable kernel. The parameters to be used may be inherited from the prototyped application. For example, if particular gains were determined for a convolution filter kernel during the prototyping of the application, these gains may be imported into the host application.

Generation of the host application may further include the implementation of a user interface and/or data acquisition interfaces, e.g. for image and/or audio data. After completion of the coding of the host application, the host application code may be compiled, in order to obtain the executable host application.

After execution of Steps 202 and 204, the design of the distributed software application may be complete. The distributed software application, including the host application and the run-time configurable kernel(s) may thus produce output similar to the output of the prototyped application of Step 200, for the same input.

FIGS. 3 and 4 describe the execution of the distributed software application, in accordance with one or more embodiments of the invention. FIG. 3 shows the steps performed by the host application and FIG. 4 shows the steps performed by the run-time configurable kernel. While FIGS. 3 and 4 only describe interactions between a single host application and a single run-time configurable kernel, those skilled in the art will appreciate that there may be any number of host applications and any number of run-time configurable kernels, without departing from the invention. For example, a single host application may call multiple different run-time configurable kernels, and/or multiple host applications may outsource operations to the same run-time configurable kernel.

FIG. 3 shows the steps performed by the host application interacting with the run-time configurable kernel when outsourcing a mathematical or logical operation. The host application may, in addition, perform other steps that are not shown in FIG. 3. For example, prior to the execution of the steps shown in FIG. 3, the host application may acquire data to be processed, and may determine processing options, e.g. options specified by a user operating the host application. Further, the host application may convert the acquired data (e.g. by preprocessing the acquired data) to a format accepted by the run-time configurable kernel selected to perform an operation on the data. Data processing by the host application may include any type of data processing that is not outsourced to the run-time configurable kernel, i.e., any data processing performed by the host application. Additional data processing may occur during the execution of the steps of FIG. 3, for example, after a result is returned to the host application by the run-time configurable kernel, if the returned result needs to be processed in preparation of a subsequent operation to be outsourced to either the same run-time configurable kernel or to a different run-time configurable kernel. Further, kernel operation output data that is returned to the host application may undergo additional processing by the host application, e.g., to obtain a result to be presented to the user. Accordingly, additional locally performed operations that are not shown in FIG. 3 may occur at any time before, during or after the execution of the steps described in FIG. 3. If the host application relies on multiple run-time configurable kernels, the steps described in FIG. 3 may be executed for each run-time configurable kernel.

Turning to FIG. 3, in Step 300, kernel operation input data are sent to the FPGA device. The kernel operation input data, in accordance with an embodiment of the invention, are data whose processing is to be outsourced to the run-time configurable kernel programmed into the FPGA of the FPGA device.

In Step 302, kernel operation parameters are sent to the FPGA device. The kernel operation parameters, in accordance with an embodiment of the invention, are used to parameterize, at run-time, the run-time configurable kernel, to perform the desired operation on the kernel operation input data provided in Step 302.

In one embodiment of the invention, Steps 300 and 302 are performed using a single function call. The function call may include input arguments that specify the kernel operation input data and the kernel operation parameters. The function call may invoke a communication with the FPGA device to hand over the kernel operation input data and the kernel operation parameters to the run-time configurable kernel. The function call may further include return arguments to be used for obtaining kernel operation output data from the FPGA device after the kernel operation has been completed.

After the completion of Steps 300 and 302, the run-time configurable kernel may perform the kernel operation on the kernel operation input, using the kernel operation parameters to produce a kernel operation output, as described in FIG. 4.

In Step 304, the kernel operation output data may be obtained from the FPGA device. Execution of Step 304 is optional and may only be performed in cases where the kernel operation output data are required by the host application, for example, if the kernel operation output data are the final result of the outsourced operations. The kernel operation output data may be obtained, for example, by reading, from a memory area of the FPGA or from a memory area external to the FPGA, the kernel operation output data. In contrast, if other outsourced operations are to be performed on the kernel operation output, the kernel operation output may not be returned to the host application.

In Step 306, a determination is made about whether additional kernel operations are remaining. Additional kernel operation may be remaining if the host application specifies other operations to be outsourced to the run-time configurable kernel of the FPGA device. Consider the example of a host application that requires multiple matrix multiplications. In such a scenario, the run-time configurable kernel may be called a first time from the host application to perform the first matrix multiplication, and it may be called a second time to perform the second matrix multiplication, etc.

If a determination is made that additional kernel operations are remaining, the method may return to either Step 302 or to Step 300. The method may return to Step 300 if new kernel operation input data are required, e.g., when the output of a prior kernel operation alone is not sufficient as the input data for the upcoming kernel operation. In this case, kernel operation input data and kernel operation parameters (Steps 300 and 302, respectively) may be provided to the FPGA device. Alternatively, the method may return to Step 302, if an additional kernel operation is to be performed that does not require additional kernel operation input data, e.g. in cases where data locally available on the FPGA device are sufficient as the input to the upcoming kernel operation. In this case, only kernel operation parameters may be provided to the FPGA device (Step 302), but not kernel operation input data (Step 300).

If a determination is made that no additional kernel operations are remaining, the execution of the method of FIG. 3 may terminate.

FIG. 4 shows the steps performed by an FPGA device when performing an operation that was outsourced to the FPGA device by the host application. The steps may be repeated each time an operation is outsourced to the FPGA device. Thus, the method described in FIG. 4 may be invoked repeatedly, if the host application repeatedly requests the kernel operation.

Turning to FIG. 4, in Step 400, kernel operation input data are obtained by the FPGA device. The kernel operation input data may be obtained from the host application requesting the kernel operation. Alternatively or additionally, kernel operation input data may be obtained from the FPGA device's memory, for example, if kernel operation output data from a previous kernel operation are to be used as kernel operation input data for the current kernel operation. If the execution of the kernel operation involves multiple FPGAs, kernel operation input data may be exchanged between FPGAs. Step 400 may be performed in conjunction with Step 300 of FIG. 3, if kernel operation input data is obtained from the host application.

In Step 402, kernel operation parameters are obtained by the FPGA device. Step 403 may be performed in conjunction with Step 302 of FIG. 3.

In Step 404, the run-time configurable kernel, programmed into the FPGA of the FPGA device, is parameterized using the kernel parameters provided in Step 402. The run-time parameterization of the run-time configurable kernel enables the kernel to perform the desired operation on the kernel operation input data, without requiring reprogramming of the kernel into the FPGA. If the run-time configurable kernel is invoked repeatedly, prior to each subsequent kernel operation, the kernel may be re-parameterized to perform a kernel operation specific to the kernel operation input data, without requiring the reprogramming of the kernel into the FPGA.

In Step 406, the kernel operation may be performed on the kernel operation input data, using the kernel operation parameters, to obtain kernel operation output data. The kernel operation output data may be stored, e.g., in RAM on the FPGA itself or elsewhere on the FPGA device, until the kernel operation output data become kernel operation input data for the next kernel operation. The stored kernel operation output data may further be retrieved by the host application reading the memory area where the kernel operation output data are stored, as described in Step 304 of FIG. 3.

Figure 5A:
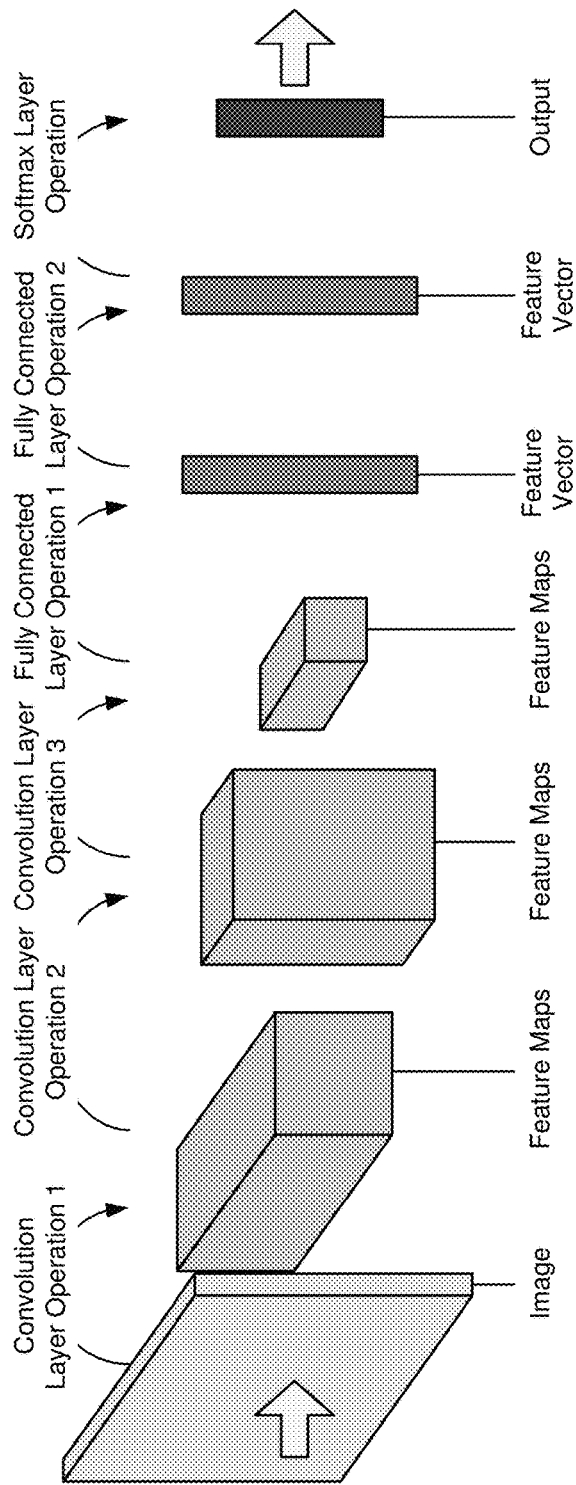
FIGS. 5A and 5B show examples, in accordance with one or more embodiments of the invention.
Figure 5B:
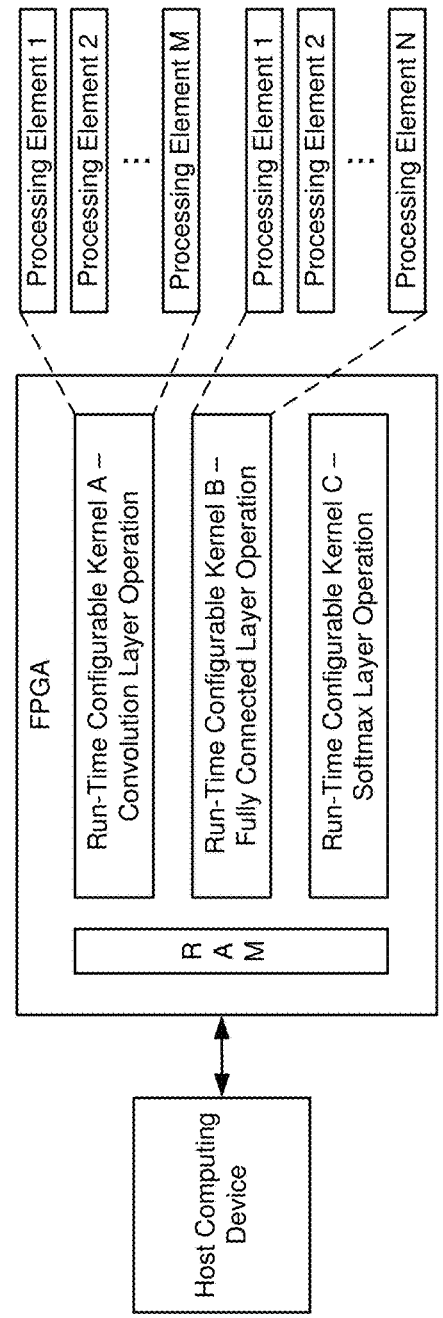

FIGS. 5A and 5B show examples, in accordance with one or more embodiments of the invention. A use case scenario, based on these examples, is intended to provide an illustration of the method for outsourcing computations to an FPGA device, described in FIGS. 2-4. The use case scenario is based on a method for image processing that uses convolutional neural networks to classify the content of images. Other neural network-based methods analogous to the described method may be used to perform image detection, segmentation, etc. The use case scenario is for illustrative purposes only and the methods described by FIGS. 2-4 are not limited to the image processing example, but rather are universally applicable to a wide range of data processing tasks in different fields and of different complexity and size.

Consider the task of automated image classification, where images are presented to a classifier that assigns class labels to the images. Class labels may be, for example, "frog", "cat", "dog", etc. Convolutional neural networks (CNNs) are known to be capable of performing this task. Accordingly, the developer of the classifier decides to tackle the classification problem by designing a classifier that is based on a CNN. The complete prototyped CNN includes three convolution layer operations, two fully connected layer operations, and a softmax layer operation, as indicated in FIG. 5A. As can be seen in FIG. 5A, the various operations may have differing dimensionalities, as indicated by the varying height, length and width of the blocks that symbolize the inputs and/or outputs of the operations. For example, the input may have a dimensionality of an image. In the example of FIGS. 5A and 5B, the obtained image has 256×256 pixels, and the dimensionality of the image is 256×256×3 because red, green and blue channels are separately represented. The dimensionalities of the feature maps, feature vectors and the output, shown in FIG. 5A are a result of a particular choice of design parameters that were determined during the prototyping of the application.

Next, the developer decides to implement the prototyped application as a shared application that outsources the convolution layer operations, the fully connected layer operations and the softmax layer operation to run-time configurable kernels that execute on an FPGA. The developer selects the appropriate kernels (one convolution layer kernel, one fully connected layer kernel, and one softmax layer kernel) from the kernel library. An exemplary FPGA programmed with these kernels is shown in FIG. 5B. Run-time configurable kernel A is a kernel configured to perform convolution layer operations, run-time configurable kernel B is a kernel configured to perform fully connected layer operations and run-time configurable kernel C is a kernel configured to perform softmax layer operations.

Prior to programming the kernels into the FPGA, the developer sizes the kernels to include the number of processing elements necessary to perform the kernel operations. The developer determines the size of the kernels based on various criteria including performance requirements (more processing elements may result in a higher performance), resources available on the FPGA, power constraints, etc. The number of processing elements depends on the operations established during the prototyping of the application.

Each of the three kernels that are programmed into the FPGA are sized such that the kernel includes a sufficient number of processing elements to be capable of performing the operation that requires the largest number of processing elements. For example, convolution layer operations 1, 2 and 3 of FIG. 5A are performed by run-time configurable kernel A of FIG. 5B. If convolution layer operation 2 requires more processing elements than convolution layer operations 1 and 3, run-time configurable kernel is sized to include the processing elements necessary to accommodate convolution layer operation 2. Once the size of the kernels has been determined, the resized kernels are compiled and programmed into the FPGA.

Subsequently, the developer generates the host application code. The host application code includes an interface to an image acquisition system such as a digital camera, configured to capture images to be classified. The host application code further includes function calls to invoke the run-time configurable kernels when performing the image classification. The function calls occur in the following order: (i) convolution layer operation 1; (ii) convolution layer operation 2; (iii) convolution layer operation 3; (iv) fully connected layer operation 1; (v) fully connected layer operation 2; (vi) softmax layer operation. (i)-(iii) are calls directed to kernel A on the FPGA. However, each call is performed with a different set of kernel operation parameters that is specific to the convolution layer operation to be performed. (iv) and (v) are calls directed to kernel B on the FPGA, with each call being made using a set of kernel operation parameters that is specific to the fully connected layer operation to be performed. The kernel operation parameters to be used in the kernel operations are imported from the prototyped application into the host application, thus enabling the host application to perform run-time parameterizations of the run-time configurable kernels when executing the application.

Upon completion of the host application code, the developer compiles the host application code to obtain the executable host application. The above steps complete the generation of the distributed software application, designed to classify images.

The subsequent description illustrates the use of the distributed software application for classifying images.

An image to be classified is obtained by the host application. The image includes a number of pixels. The image is thus handled as a matrix of pixel intensity values. Red, green and blue intensity channels are separately maintained.

Next, the host application sends the kernel operation parameters for the first, the second and the third convolution layer operations, and the kernel operation parameters for the first and the second fully connected layer operations to the FPGA. The kernel operation parameters for the convolution layer operations specify, separately for each convolution layer operation, an input feature map size (specifying the number of rows and columns of pixels in each of the input features); the number of input feature maps; the number of output feature maps; the size and the gains of the convolution filter kernel; the stride to be used when applying the convolution filter kernel to an input feature map; the neighborhood size for pooling, if pooling is performed after the convolution operation; the type of pooling to be performed; and the stride to be used when pooling.

Subsequently, the host application sends the input data (i.e., the captured image) to the FPGA and calls run-time configurable kernel A, parameterized with the kernel operation parameters for the first convolution layer operation. In the example, the run-time configurable kernel A is called using the following command, in order to perform the first convolution layer operation:

au_cifar10.convolutionForward <float> (oclBase, conv_tensor_in, conv_filter0, conv_tensor_out0, conv_bias0, poolDesc0, conv_stride, pad, relu, split, start);

The function "au_cifar10.convolutionForward" calls run-time configurable kernel A using the subsequently described arguments. Similar commands may be used to perform all other outsourced operations in the example.

"oclBase" specifies the environment to be used in order to reach the FPGA platform and the kernel to be used. "conv_tensor_in" is a handle to the input tensor. For the first convolution layer operation, the input tensor includes the image to be classified. "conv_filter0" specifies the weights of the convolution filter kernel. "conv_tensor_out0" is a handle to the output tensor. The output tensor, after completion of the first convolution layer operation, contains the convolution layer operation output, i.e., the feature maps resulting from the convolution layer operation performed on the input image. "conv_bias0" includes bias offsets to be applied to the output of the convolution layer operation. "poolDesc0" provides instructions for pooling (i.e., down-sampling) of the output of the convolution layer operation. "conv_stride" specifies the stride to be used when repeatedly applying the convolution filter kernel. "pad" specifies the padding (e.g., zero-padding) to be performed prior to the convolution layer operation, in order to obtain a desired output feature map size. "relu" specifies whether the rectified linear units (ReLU) activation function is to be applied to the convolution layer operation output. "split" specifies whether the convolution operation is to be split (e.g., to be performed by multiple separate run-time configurable kernels executing on separate FPGAs. "start" specifies whether the performed convolution layer operation is the first convolution layer operation of a series of operations. In the above example, the convolution layer operation is performed on the input image and therefore is the first operation in a series of operations. The majority of the above settings and parameters are directly inherited from the prototyped application, e.g. by importing these settings.

The output of the first convolution layer operation is a set of feature maps that serve as the input to the second convolution layer operation. Accordingly, the host application calls run-time configurable kernel A parameterized with the kernel operation parameters for the second convolution layer operation. Subsequently, the third convolution layer operation is performed on the output of the second convolution layer operation using run-time configurable kernel A, parameterized with the kernel operation parameters for the third convolution layer operation.

Next, the first fully connected layer operation is performed on the output of the third convolution layer operation using run-time configurable kernel B, parameterized with the kernel operation parameters for the first fully connected layer operation, and the second fully connected layer operation is performed on the output of the first fully connected layer operation using run-time configurable kernel B, parameterized with the kernel operation parameters for the second fully connected layer operation.

Finally, the softmax layer operation is performed on the output of the second fully connected layer operation using run-time configurable kernel C, parameterized with the kernel operation parameters for the softmax layer operation. The output is a classification result that is returned to the host application.

The above example illustrates how kernels may be re-parameterized at run-time to perform different operations. While the above example illustrates the use of kernels on image data, the same kernels may also be used on other types of input data. For example, the same kernels may be called from a second host application that performs speech processing. To perform meaningful operations on the speech data, the kernels may be re-parameterized at run-time, as necessary. No reprogramming of the kernels is necessary.

Various embodiments of the invention have one or more of the following advantages: the ability to outsource mathematical and or logical operations to a highly performance-optimized yet versatile kernel that is hosted on an accelerator device such as a field programmable gate array (FPGA) device; the ability to conserve processor time of the host computing device by outsourcing the mathematical and/or logical operations to the FPGA device; the ability to accelerate the execution of the software application that includes the outsourced operations; the ability to reduce overall power consumption; the ability to enable users without FPGA programming expertise to outsource operations to FPGA devices; the ability to perform different operations and to serve different applications by re-parameterizing the run-time configurable kernel of the FPGA device rather than reprogramming the FPGA with a different kernel; the ability to scale FPGA kernels to fit onto different size FPGAs; the ability to distribute a mathematical and/or logical operation over multiple FPGAs; and the ability to generate FPGA kernels for different models of FPGAs from different manufacturers.

Figure 6:
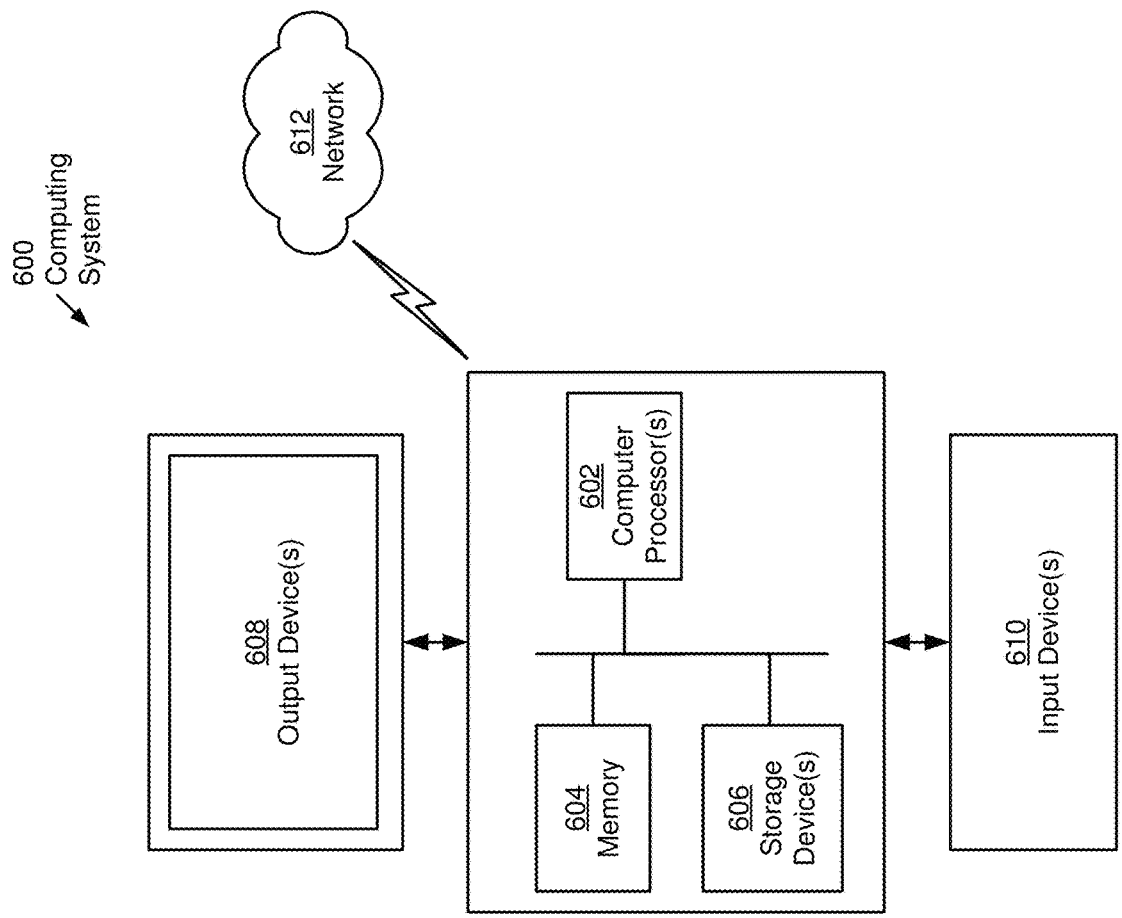
FIG. 6 shows a computing system, in accordance with one or more embodiments of the invention.

Various components of one or more embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (614) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (614). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for accelerating algorithms and applications, the method comprising:
   programming a first run-time configurable kernel, the programming comprising:
      deriving, from a kernel template, a specific kernel by scaling the kernel template according to specifications; and
      installing the scaled kernel;
   obtaining, from a host application, by a run-time configurable kernel, implemented in programmable logic, a first set of kernel input data, the run-time configurable kernel being operable to perform a plurality of kernel operations, each kernel operation of the plurality of kernel operations being a different operation from each other kernel operation of the plurality of kernel operations;
   obtaining, from the host application, by the run-time configurable kernel, a first set of kernel operation parameters that specifies which first kernel operation of the plurality of kernel operations is to be performed by the run-time configurable kernel;
   parameterizing the run-time configurable kernel, at run-time without reprogramming the programmable logic with a different kernel, using the first set of kernel operation parameters to perform the specified first kernel operation on the first set of kernel input data, wherein the first set of kernel input data describes one or more convolution layers or feature vectors; and
   performing, by the parameterized run-time configurable kernel, the specified first kernel operation on the first set of kernel input data to obtain a first set of kernel output data;
   obtaining, from the host application, by the first run-time configurable kernel, a second set of kernel operation parameters that specifies which second kernel operation of the plurality of kernel operations is to be performed by the first run-time configurable kernel;
   re-parameterizing the first run-time configurable kernel using the second set of kernel operation parameters to perform the specified second kernel operation; and
   performing, by the re-parameterized first run-time configurable kernel, the specified second kernel operation on a second set of kernel input data to obtain a second set of kernel output data without installing a new derived kernel;
   wherein the plurality of kernel operations includes one or more selected from a group comprising a convolutional neural network, a recurrent neural network, a convolution, a deconvolution, a matrix multiplication, and a vector multiplication.

2. The method of claim 1, wherein the second set of kernel input data is obtained from the first set of kernel output data.

3. The method of claim 1, further comprising:
   obtaining, from the host application, by a second run-time configurable kernel, a second set of kernel operation parameters, the second run-time configurable kernel being operable to perform a second plurality of kernel operations, each kernel operation of the second plurality of kernel operations being a different operation from each other kernel operation of the second plurality of kernel operations, the second set of kernel operation parameters specifying which second kernel operation of the second plurality of kernel operations is to be performed by the second run-time configurable kernel;
   parameterizing the second run-time configurable kernel at run-time using the second set of kernel operation parameters to perform the specified second kernel operation; and
   performing, by the parameterized second run-time configurable kernel, the specified second kernel operation on a second set of kernel input data to obtain a second set of kernel output data.

4. The method of claim 1, further comprising, after performing the specified first kernel operation, retrieving, by the host application, the first set of kernel output data.

5. The method of claim 1, wherein the kernel operation parameters comprise at least one selected from the group consisting of a dimensionality of the kernel input data, a dimensionality of the kernel output data, a convolution filter kernel, a convolution filter kernel stride, a pooling stride, a pooling window size, a number of input feature maps, a number of output feature maps, and an output feature map size.

6. The method of claim 1, wherein the first set of kernel input data comprises a plurality of data points; and wherein the performing of the specified first kernel operation on the first set of kernel input data comprises processing the plurality of data points in parallel, by a plurality of processing elements of the first run-time configurable kernel.

7. The method of claim 1, further comprising:
   obtaining, from a second host application, by the first run-time configurable kernel, a second set of kernel input data;
   obtaining, from the second host application, by the first run-time configurable kernel, a second set of kernel operation parameters that specifies which second kernel operation of the plurality of kernel operations is to be performed by the first run-time configurable kernel;

parameterizing the first run-time configurable kernel, at run-time, using the second set of kernel operation parameters to perform the specified second kernel operation; and performing, by the parameterized first run-time configurable kernel, the specified second kernel operation on the second set of kernel input data to obtain a second set of kernel output data.

8. A system for accelerating algorithms and applications on field programmable gate arrays (FPGAs), comprising:
a host computing device;
an FPGA device; and
a run-time configurable kernel implemented in programmable logic of the FPGA device, the run-time configurable kernel being operable to perform a plurality of kernel operations, each kernel operation of the plurality of kernel operations being a different operation from each other kernel operation of the plurality of kernel operations, and the run-time configurable kernel being configured to:
  programming the run-time configurable kernel, the programming comprising:
    deriving, from a kernel template, a specific kernel by scaling the kernel template according to specifications; and
    installing the scaled kernel;
  obtain, from a host application executing on the host computing device, a first set of kernel input data;
  obtain, from the host application, a first set of kernel operation parameters that specifies which first kernel operation of the plurality of kernel operations is to be performed by the run-time configurable kernel;
  parameterize the run-time configurable kernel, at run-time without reprogramming the programmable logic of the FPGA device with a different kernel, using the first set of kernel operation parameters to perform the specified first kernel operation on the first set of kernel input data, wherein the first set of kernel input data describes one or more convolution layers or feature vectors;
  perform, based on the parameterization based on the first set of kernel operation parameters, the specified first kernel operation on the first set of kernel input data to obtain a first set of kernel output data;
  obtain, from the host application, a second set of kernel operation parameters that specifies which second kernel operation of the plurality of kernel operations is to be performed by the run-time configurable kernel;
  re-parameterize the run-time configurable kernel, using the second set of kernel operation parameters to perform the specified second kernel operation; and
  perform, after the re-parameterization based on the second set of kernel operation parameters, the specified second kernel operation on a second set of kernel input data to obtain a second set of kernel output data;
wherein the plurality of kernel operations includes one or more selected from a group comprising a convolutional neural network, a recurrent neural network, a convolution, a deconvolution, a matrix multiplication, and a vector multiplication.

9. The system of claim 8, wherein the kernel operation parameters comprise at least one selected from the group consisting of a dimensionality of the kernel input data, a dimensionality of the kernel output data, a convolution filter kernel, a convolution filter kernel stride, a pooling stride, a pooling window size, a number of input feature maps, a number of output feature maps, and an output feature map size.

10. The system of claim 8, wherein the second set of kernel input data is obtained from the first set of kernel output data.

11. The system of claim 8, wherein the run-time configurable kernel is further configured to:
  obtain, from the host application, by a second run-time configurable kernel, a second set of kernel operation parameters, the second run-time configurable kernel being operable to perform a second plurality of kernel operations, each kernel operation of the second plurality of kernel operations being a different operation from each other kernel operation of the second plurality of kernel operations, the second set of kernel operation parameters specifying which second kernel operation of the second plurality of kernel operations is to be performed by the second runtime configurable kernel;
  parameterize the second run-time configurable kernel at run-time using the second set of kernel operation parameters to perform the specified second kernel operation; and
  perform, by the parameterized second run-time configurable kernel, the specified second kernel operation on a second set of kernel input data to obtain a second set of kernel output data.

12. The system of claim 8, wherein the run-time configurable kernel is further configured to:
  obtain, from a second host application, by the run-time configurable kernel, a second set of kernel input data;
  obtain, from the second host application, by the run-time configurable kernel, a second set of kernel operation parameters that specifies which second kernel operation of the plurality of kernel operations is to be performed by the run-time configurable kernel;
  parameterize the run-time configurable kernel, at run-time, using the second set of kernel operation parameters to perform the specified second kernel operation; and
  perform, by the parameterized run-time configurable kernel, the specified second kernel operation on the second set of kernel input data to obtain a second set of kernel output data.

13. A non-transitory computer readable medium (CRM) storing instructions for accelerating algorithms and applications the non-transitory CRM not including a propagation signal, the instructions comprising functionality for:
  programming a first run-time configurable kernel, the programming comprising:
    deriving, from a kernel template, a specific kernel by scaling the kernel template according to specifications; and
    installing the scaled kernel;
  obtaining, from a host application, by a run-time configurable kernel, implemented in programmable logic, a first set of kernel input data, the run-time configurable kernel being operable to perform a plurality of kernel operations, each kernel operation of the plurality of kernel operations being a different operation from each other kernel operation of the plurality of kernel operations;
  obtaining, from the host application, by the run-time configurable kernel, a first set of kernel operation parameters that specifies which first kernel operation of the plurality of kernel operations is to be performed by the run-time configurable kernel;

parameterizing the run-time configurable kernel, at run-time without reprogramming the programmable logic of the FPGA with a different kernel, using the first set of kernel operation parameters to perform the specified first kernel operation on the first set of kernel input data, wherein the first set of kernel input data describes one or more convolution layers or feature vectors; and performing, by the parameterized run-time configurable kernel, the specified first kernel operation on the first set of kernel input data to obtain a first set of kernel output data;

obtaining, from the host application, by the first run-time configurable kernel, a second set of kernel operation parameters that specifies which second kernel operation of the plurality of kernel operations is to be performed by the first run-time configurable kernel;

re-parameterizing the first run-time configurable kernel using the second set of kernel operation parameters to perform the specified second kernel operation; and performing, by the re-parameterized first run-time configurable kernel, the specified second kernel operation on a second set of kernel input data to obtain a second set of kernel output data without installing a new derived kernel;

wherein the plurality of kernel operations includes one or more selected from a group comprising a convolutional neural network, a recurrent neural network, a convolution, a deconvolution, a matrix multiplication, and a vector multiplication.

14. The non-transitory CRM of claim 13, wherein the kernel operation parameters comprise at least one selected from the group consisting of a dimensionality of the kernel input data, a dimensionality of the kernel output data, a convolution filter kernel, a convolution filter kernel stride, a pooling stride, a pooling window size, a number of input feature maps, a number of output feature maps, and an output feature map size.

15. The non-transitory CRM of claim 13, wherein the second set of kernel input data is obtained from the first set of kernel output data.

16. The non-transitory CRM of claim 13, wherein the instructions further comprise functionality for:
obtaining, from the host application, by a second run-time configurable kernel, a second set of kernel operation parameters, the second run-time configurable kernel being operable to perform a second plurality of kernel operations, each kernel operation of the second plurality of kernel operations being a different operation from each other kernel operations of the second plurality of kernel operations, the second set of kernel operation parameters specifying which second kernel operation of the second plurality of kernel operations is to be performed by the second runtime configurable kernel;

parameterizing the second run-time configurable kernel at run-time using the second set of kernel operation parameters to perform the specified second kernel operation; and performing, by the parameterized second run-time configurable kernel, the specified second kernel operation on a second set of kernel input data to obtain a second set of kernel output data.

17. The non-transitory CRM of claim 13, wherein the instructions further comprise functionality for:
obtaining, from a second host application, by the first run-time configurable kernel, a second set of kernel input data;

obtaining, from the second host application, by the first run-time configurable kernel, a second set of kernel operation parameters that specifies which second kernel operation of the first plurality of kernel operations is to be performed by the first run-time configurable kernel;

parameterizing the first run-time configurable kernel, at run-time, using the second set of kernel operation parameters to perform the specified second kernel operation; and performing, by the parameterized first run-time configurable kernel, the specified second kernel operation on the second set of kernel input data to obtain a second set of kernel output data.

\* \* \* \* \*